United States Patent [19]

Wu

[11] Patent Number: 6,019,324

[45] Date of Patent: Feb. 1, 2000

[54] BAG CRADLE FOR A GOLF CART

[76] Inventor: David Wu, No. 35-1, Jih Hsin Street, Tu Cheng Hsiang, Taipei Hsien, Taiwan

[21] Appl. No.: 09/176,221

[22] Filed: Oct. 21, 1998

[51] Int. Cl.[7] .................................................. A63B 55/00
[52] U.S. Cl. ........................ 248/96; 224/274; 280/DIG. 6
[58] Field of Search .................................. 248/96, 230.8, 248/219.4; 224/274, 901.4; 280/DIG. 6; 206/315.3

[56] References Cited

U.S. PATENT DOCUMENTS

| 5,351,983 | 10/1994 | Descalo | 248/96 X |
| 5,573,211 | 11/1996 | Wu | 248/96 |
| 5,718,401 | 2/1998 | Walters | 248/96 X |
| 5,871,183 | 2/1999 | Milluzzi | 248/96 |

*Primary Examiner*—Ramon O. Ramirez
*Attorney, Agent, or Firm*—Dougherty & Troxell

[57] ABSTRACT

A bag cradle includes a cradle body mounted on a rod member of a golf cart, the cradle body having an recessed horizontal top wall adapted to support a golf bag, and a strap fastened to the cradle body for securing a golf bag to the recessed horizontal top wall of the cradle body, wherein the cradle body has to two supporting arms respectively smoothly curved from two opposite ends of the recessed horizontal top wall for supporting a golf bag on the recessed horizontal top wall of the cradle body, the supporting arms each having an end notch; the strap has a first end fastened to a belt fitting at the end notch at one supporting arm, and a second end inserted through the end notch at the other supporting arm and secured in place by hook and loop materials thereof.

1 Claim, 3 Drawing Sheets

BAG CRADLE FOR A GOLF CART

BACKGROUND AND SUMMARY OF THE INVENTION

The present invention relates to a golf cart, and more specifically to a bag cradle for mounting on a golf cart for holding a golf bag.

A golf cart, as shown in FIG. 1, comprises an upper bag cradle and a lower bag cradle for holding a golf bag. The upper bag cradle and the lower bag cradle are respectively equipped with a strap for securing the golf bag loaded thereon. The upper bag cradle has a recessed top wall adapted to hold a golf bag, and two pairs of through holes for receiving the respective strap, and a recessed middle hole. The strap body of the strap is inserted through the through holes with its both ends joined by a quick release hook (which is formed of a hook side and a a socket side). The quick release hook has a fitting at its hook side. One end of the strap body of the strap is fastened to the fitting at the hook side of the quick release hook, and adjusted to the desired length. This upper cradle design has drawbacks. Because the recessed top wall of the upper cradle has a limited surface, the upper cradle can not stably support the loaded golf bag in place. Another drawback of this design of upper cradle is the complicated installation procedure of the strap. Furthermore, the processing of the through holes and the recessed middle hole greatly increases the manufacturing cost of the upper cradle, and obstructs its sense of beauty.

The present invention eliminates the aforesaid drawbacks. According to one aspect of the present invention, two supporting arms are respectively smoothly curved from the two opposite ends of the recessed top wall of the cradle body for supporting the loaded golf bag firmly on the cradle body. According to another aspect of the present invention, the strap which is used to fix the loaded golf bag on the cradle body of the bag cradle has one end fastened to a belt fitting at one supporting arm, and an opposite end inserted through an end not on the other supporting arm and then secured in place at the desired posotion by hook and loop materials.

DETAILED DESCRIPTION OF THE PREFERRED EMBODIMENT

Figure 1:
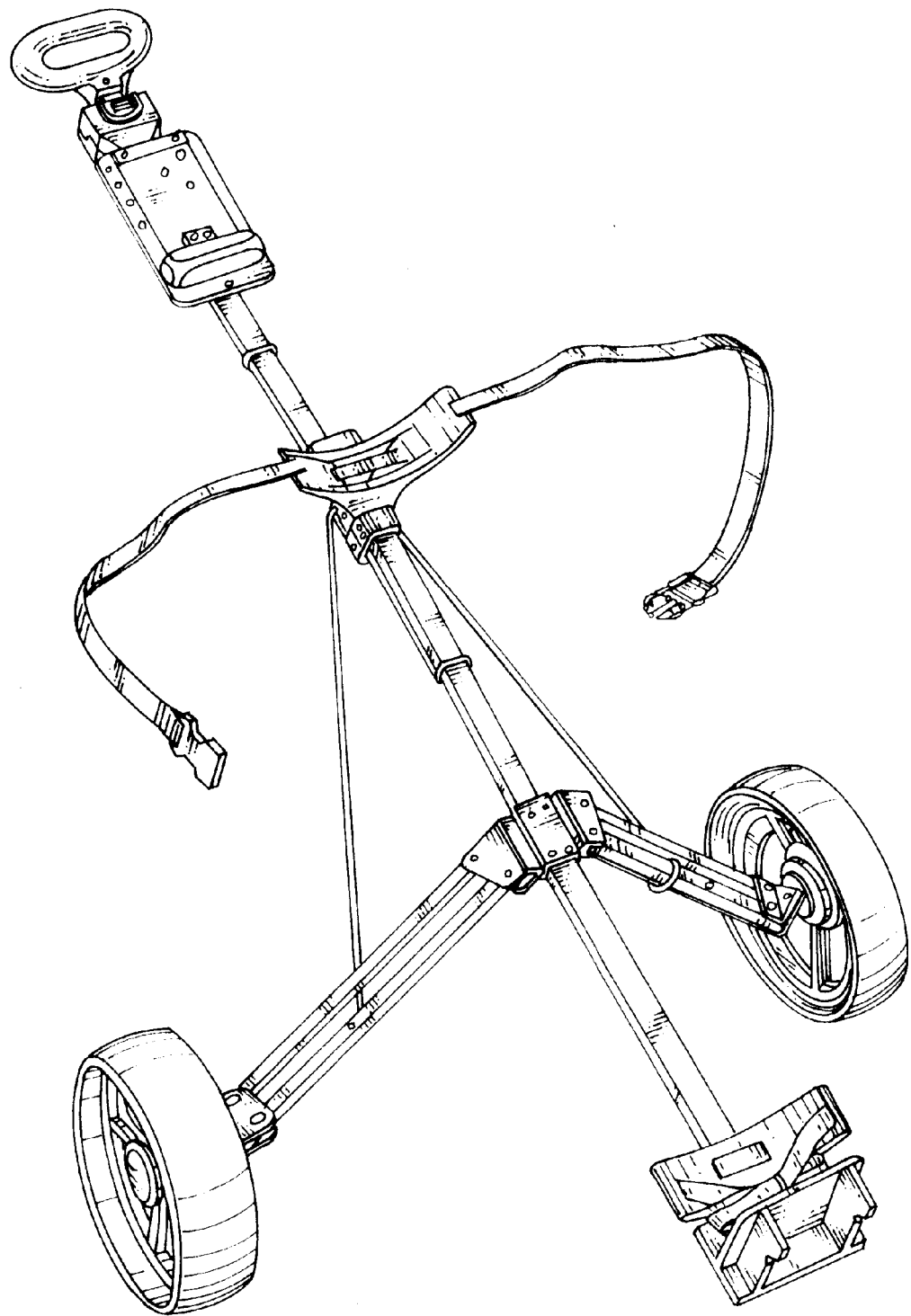
FIG. 1 is a perspective view of a golf cart according to the prior art.
Figure 2:
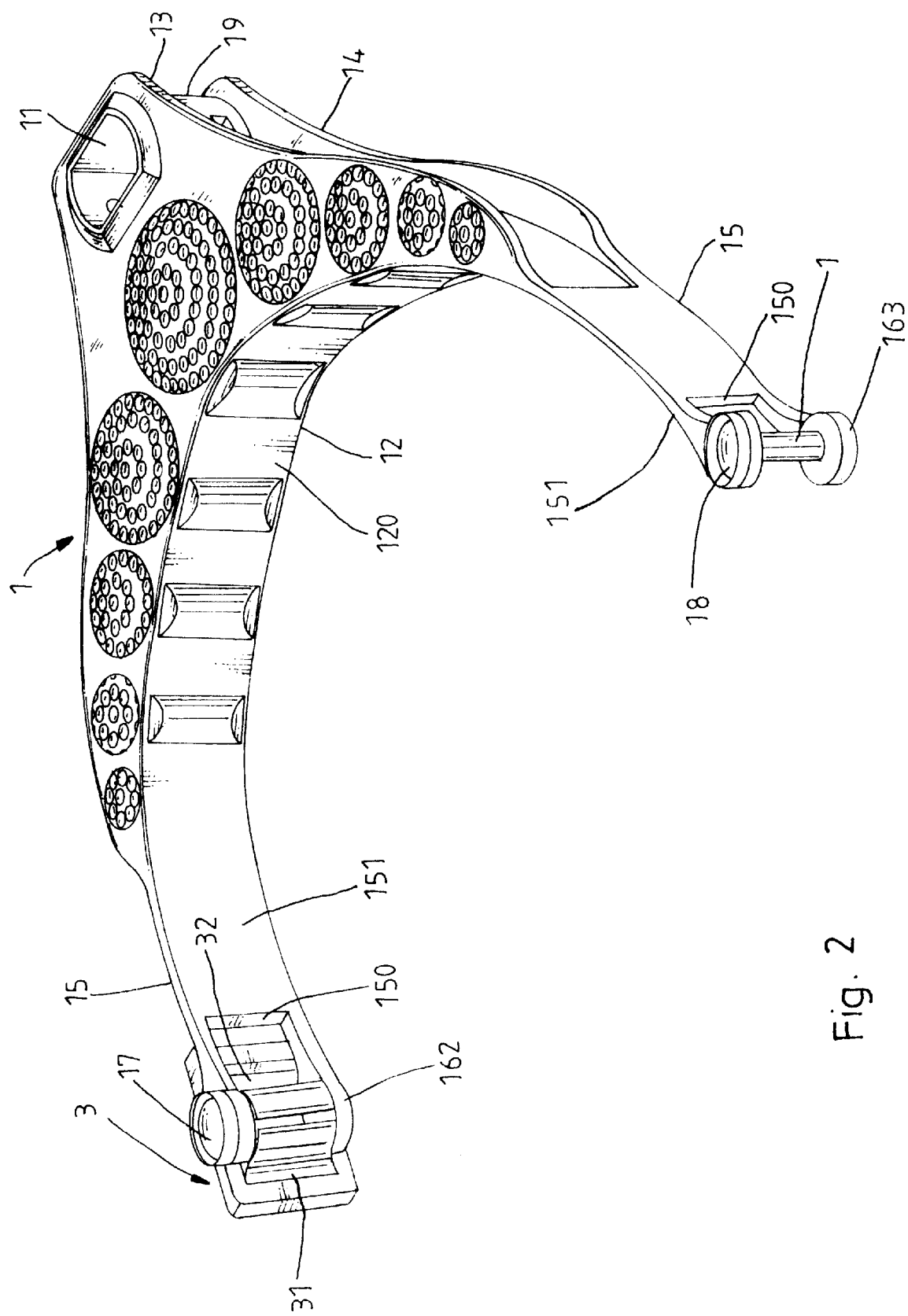
FIG. 2 is a perspective view of a part of the invention (the strap excluded).
Figure 3:
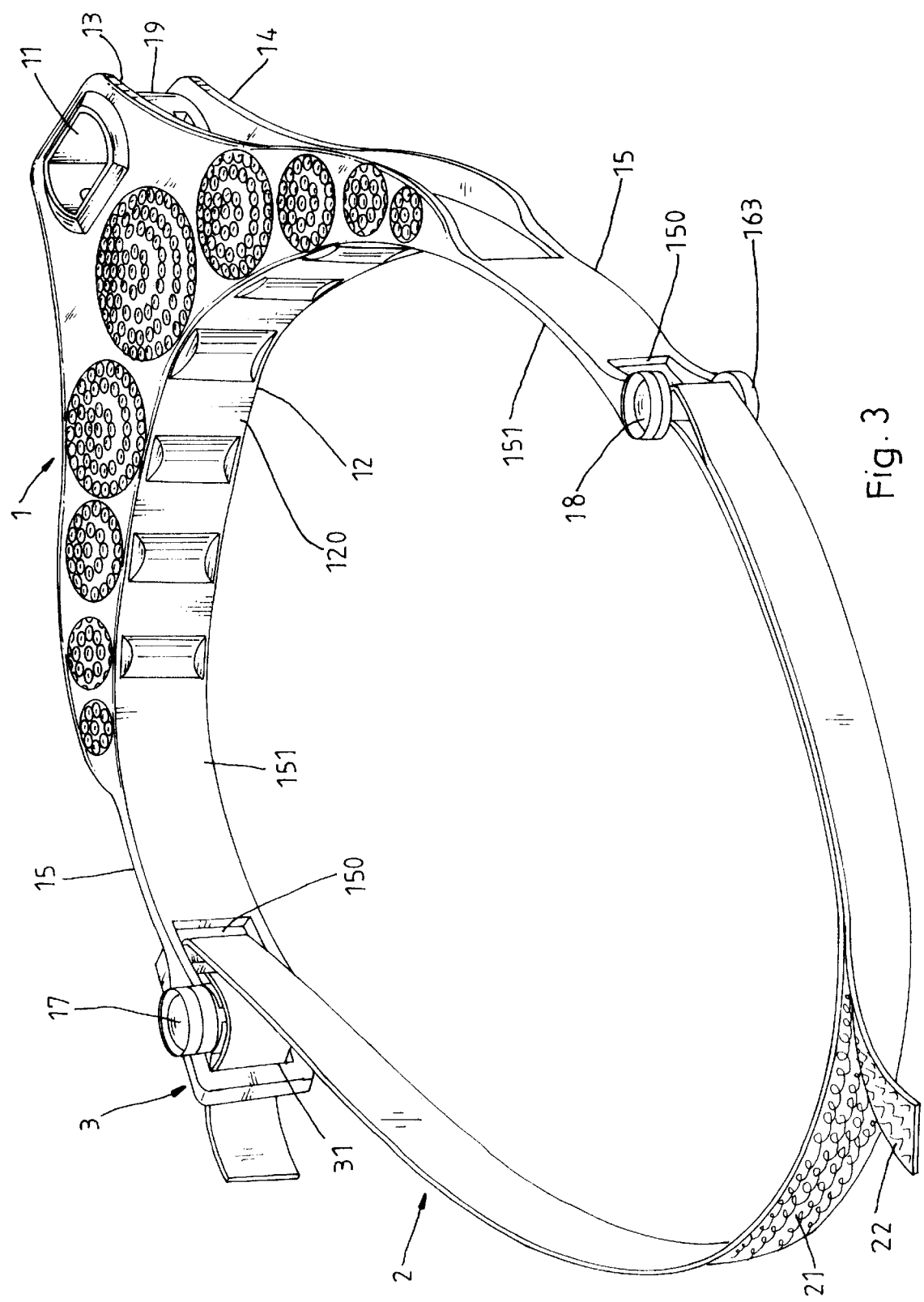
FIG. 3 is a perspective view of the bag cradle according to the present invention.

Referring to FIGS. 2 and 3, a bag cradle for a golf cart in accordance with the present invention comprises cradle body 1. The cradle body 1 comprises a first vertical side wall 13, a second vertical side wall 14, a horizontal top wall 12 connected between the first vertical side wall 13 and the second vertical side wall 14 at a top side, a plurality of transverse reinforcing ribs 19 connected between the first vertical side wall 13 and the second vertical side wall 14 below the horizontal topwall 12, and a transverse mounting hole 11 through the first vertical side wall 13 and the second vertical side wall 14 for receiving the main rod member of the golf cart. The horizontal top wall 12 has a recessed, smoothly curved top bearing surface 120 adapted to hold a golf bag.

Referring to FIGS. 2 and 3 again, two supporting arms 15 are respectively extended from two opposite ends of the horizontal top wall 12. The supporting arms 15 greatly increase the golf bag supporting area of the bag cradle, each having an inner side 151 smoothly curved from the recessed, smoothly curved top bearing surface 120 of the horizontal top wall 12, and two parallel lugs 162 or 163 at one end defining an end notch 150. Two rivets 17, 18 are respectively fastened to the parallel lugs 162 and suspended in the end notches 150. A belt fitting 3 is coupled to one rivet 17 to hold a strap 2. The belt fitting 3 has two parallel insertion holes 31, 32. The strap 2 has one end inserted through the insertion holes 31, 32 and secured to the belt fitting 3, and an opposite end inserted through one end notch 150 and turned backwards and then secured in place to hold down a golf bag on the horizontal top wall 12 by securing a tape of hook material 22 at one side of the strap 2 to a tape of loop material 21 at an opposite side of the strap 2.

Because the cradle body 1 has two supporting arms 15 extended from the ends of its horizontal top wall 12, a golf bag can be firmly supporting on the cradle body 1 and secured in place by the strap 2. Further, by means of securing the tape of hook material 22 to the tape of loop material 21, the strap 2 is fixed in position to hold down the golf bag on the cradle body 1.

I claim:

1. A bag cradle comprising a cradle body mounted on a rod member of a golf cart, said cradle body having a horizontal top wall and a recessed, smoothly curved top bearing surface provided at said horizontal top wall and adapted to hold a golf bag, and a strap fastened to said cradle body for securing a golf bag on said recessed, smoothly curved top bearing surface, wherein said cradle body comprises two supporting arms respectively extended from two opposite ends of said horizontal top wall for supporting a golf bag on the recessed, smoothly curved top bearing surface on said horizontal top wall of said cradle body, said supporting arms each having an inner side smoothly curved form the recessed, smoothly curved top bearing surface of said horizontal top wall of said cradle body, and wherein said supporting arms each have a pair of parallel lugs at one end remote from said cradle body, an end notch defined between the respective pair of parallel lugs, and a rivet connected between the respective pair of parallel lugs; said strap has a first end fastened to a belt fitting at the rivet at one of said supporting arms, and a second end inserted through the end notch at the other of said supporting arms and secured in place by hook and loop materials thereof.

* * * * *